United States Patent [19]

Strauss

[11] Patent Number: 4,691,933
[45] Date of Patent: Sep. 8, 1987

[54] WHEELCHAIR PARKING BRAKE

[76] Inventor: Herbert Strauss, 688 W. Lynwood St., Thousand Oaks, Calif. 91360

[21] Appl. No.: 586,850

[22] Filed: Mar. 6, 1984

[51] Int. Cl.⁴ ............................................. B60T 1/04
[52] U.S. Cl. .......................... 280/289 WC; 188/2 F; 280/242 WC
[58] Field of Search ............... 280/289 WC, 242 WC, 280/11.2, 647, 657, 650; 188/2 F, 29, 74, 20, 15, 19; 297/DIG. 4

[56] References Cited

U.S. PATENT DOCUMENTS

| 564,562 | 7/1896 | Holman | 188/20 |
|---|---|---|---|
| 688,328 | 12/1901 | Ong et al. | 188/15 |
| 1,085,573 | 1/1914 | Adams | 188/20 |
| 2,859,837 | 11/1958 | Mize | 188/20 |
| 4,350,227 | 9/1982 | Knoche | 280/289 WC |
| 4,371,187 | 2/1983 | Svoboda | 280/605 |

FOREIGN PATENT DOCUMENTS

| 2532485 | 2/1977 | Fed. Rep. of Germany | 188/2 F |
|---|---|---|---|
| 1139796 | 1/1969 | United Kingdom | 188/29 |
| 2108605 | 5/1983 | United Kingdom | 280/289 WC |

Primary Examiner—John J. Love
Assistant Examiner—Everett G. Diederiks, Jr.
Attorney, Agent, or Firm—Noel F. Heal; James M. Steinberger

[57] ABSTRACT

A wheel locking device for use on a wheelchair, including a locking bar connected to a shaft that is movably axially and rotationally within a fixed tube, by a single operating handle. As the operating handle is moved from a release position to a locking position, the shaft is first axially translated by means of a cam on the handle, and simultaneously rotated by means of a guide pin extending radially from the shaft and engaging a slot in the tube, to move the locking bar from a retracted position well clear of a wheel of the chair to an operative position located transversely with respect to the wheel circumference. Further movement of the operating handle translates the locking bar transversely into locking engagement with the wheel.

6 Claims, 3 Drawing Figures

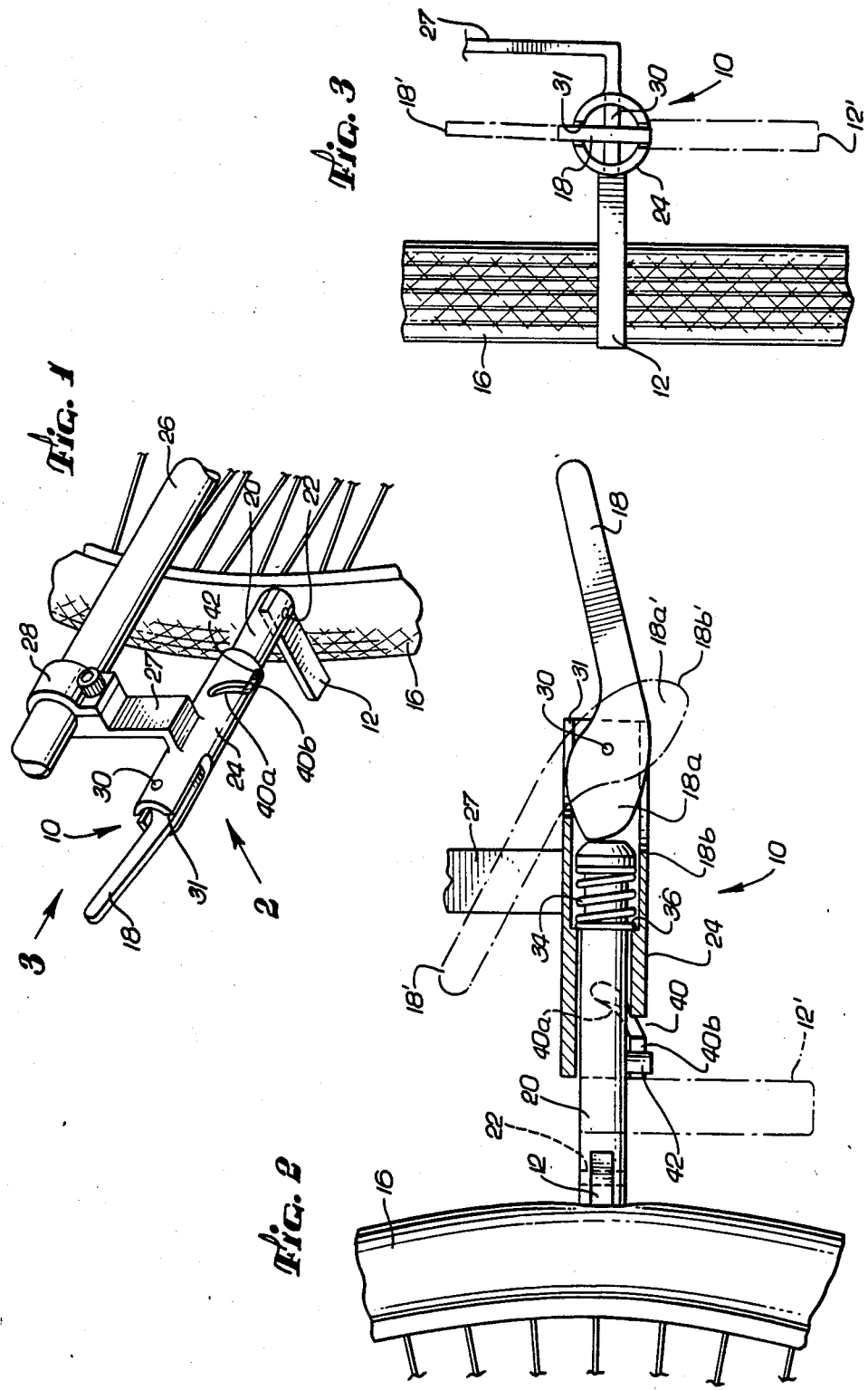

WHEELCHAIR PARKING BRAKE

BACKGROUND OF THE INVENTION

This invention relates generally to wheel-locking brakes, and more particularly, to parking brakes for wheelchairs. A manually propelled wheelchair should ideally include a reliable mechanism for locking at least one of its wheels when the wheelchair is at rest, to prevent unwanted downhill motion, and to prevent movement when the wheelchair passenger is in the act of either getting up from or sitting down in the chair.

One of the most important requirements for a wheelchair brake is that it not only be easily reached by the wheelchair passenger, but also that it not interfere with manual operation of the wheelchair when the brake is not in use. In addition, of course, the brake should operate reliably and maintain a locking position until released by the passenger. Prior braking devices for wheelchairs have not met all of these requirements, and there is accordingly still a need for improvement in the design of wheelchair parking brakes.

SUMMARY OF THE INVENTION

The present invention resides in a wheelchair parking brake device that is moved well clear of the wheel when not in its operative position. Briefly, and in general terms, the parking brake of the invention comprises a locking bar, and mechanical means for moving the locking bar between a first angular position, out of the plane of a wheel of the wheelchair, and a second angular position in which the locking bar intersects the plane of the wheel, and for moving the locking bar laterally between a released position and a locking position, such that the bar is in locking contact with the wheel when in the second angular position and the locking position.

More specifically, the mechanical means functions to apply the brake by moving the locking bar initially from the first to the second angular position, and simultaneously moving the bar laterally to an intermediate lateral position. The mechanical means then moves the locking bar laterally to the locking position while maintaining the second angular position. In the presently preferred embodiment of the invention, the mechanical means includes a tube rigidly connected to the wheelchair, a shaft connected to the locking bar and mounted for sliding and rotational movement within the tube, means for applying axial motion to the shaft within the tube, between first and second axial positions corresponding to the released and locking positions, and camming means for converting axial movement of the shaft, between the first axial position and an intermediate axial position, to an angular movement between the first and second angular positions.

In the preferred embodiment of the invention, the camming means includes a camming slot in the tube wall, and a guide pin extending radially from the shaft and into the camming slot. The camming slot has a helical section to convert axial movement of the shaft into angular movement between the first and second angular positions, and an axial section contiguous with the helical section, to provide an axial locking movement in the second angular position.

In the illustrative embodiment of the invention, the means for moving the shaft axially includes an eccentric cam having an attached operating handle and mounted for rotation on an axis transverse to the tube, and a return spring urging one end of the shaft into contact with the eccentric cam, whereby rotation of the operating handle cams the shaft axially within the tube. Preferably, the eccentric cam has a relatively flat section that engages the end of the shaft in the brake locking position, to function as a detent in the operative position of the brake.

BRIEF DESCRIPTION OF THE DRAWINGS

FIG. 1 is a perspective view of the parking brake in its locking position;

FIG. 2 is an enlarged elevational view of the parking brake, taken in the direction of the arrow 2 in FIG. 1 and shown partly in section; and FIG. 3 is a plan view of the parking brake in its locking position, taken in the direction of the arrow 3 in FIG. 1.

DESCRIPTION OF THE PREFERRED EMBODIMENT

As shown in the drawings for purposes of illustration, the present invention relates to a novel parking brake for use on a wheelchair. A wheelchair brake should not only lock a wheel of the chair to prevent its inadvertent movement, but should also retract to a position in which it does not interfere with manual operation of the wheelchair.

In accordance with the present invention, a wheelchair parking brake, indicated generally by reference numeral 10, is provided with a locking bar 12 that has a retracted position, indicated at 12', well clear of a wheel 16 of the wheelchair. An operating handle 18 of the brake 10 is, however, still within easy reach of the wheelchair passenger.

The locking bar 12 is secured by one of its ends to an actuating shaft 20, such as by a screw 22 extending transversely through one end of the shaft and axially into the locking bar. The shaft 20 is mounted for sliding and rotational movement within a cylindrical tube 24. The tube 24 is, in turn, rigidly mounted to a wheelchair frame member 26, as shown by the mounting bracket 27 and clamp 28. The operating handle 18 is pivotally connected to an end portion of the tube 24 by means of a transverse pivot pin 30. The handle is accommodated in a diametric slot 31 in the end portion of the tube 24. The end portion of the shaft 20 to which the locking bar 12 is attached projects from the end of the tube 20 opposite the end on which the pivot pin 30 is located.

Integral with the operating handle 18, is an eccentric cam 18a through which the pivot pin 30 extends. As best shown in FIG. 2, the cam 18a engages a rounded button element 32 affixed to the end of the shaft 20, such that rotation of the handle 18 from a retracted position, indicated at 18', the brake to an operative position, moves the shaft axially along the tube 24. At the end where the handle 18 is mounted, the tube 24 has enlarged internal diameter, to accomodate a coiled compression spring 34 between the shaft 20 and the tube. One end of the spring 34 engages an internal annular shoulder 36 in the tube 24, and the other end of the spring engages the periphery of the button element 32, thereby biasing the button element and the shaft 20 into engagement with the cam 18a.

The tube 24 has a slot 40 formed through its sidewall. The slot 40 has an inclined or helical section 40a extending along a ninety degree arc of the tube wall, as well as having an axial component. The helical section 40a merges with a straight axial section 40b extending all the way to the end of the tube closest to the locking bar 12. A radial guide pin 42 extends radially from the shaft 20 and engages the slot 40. When the locking bar is in its fully released position, indicated at 12' the guide pin 42 is located at the end of the slot 40 furthest from the locking bar 12. When the shaft 20 is moved axially along the tube 24 by action of the eccentric cam 18a, interaction of the guide pin 42 and the slot 40 results in a rotational movement of the shaft 20, simultaneously with its axial movement. The rotational movement takes the locking bar 12 through approximately ninety degrees, from an initial retracted position in which the bar is well clear of the wheel 16, to a position in which the bar intersects the plane of the wheel at about ninety degrees. When the guide pin 42 reaches the transition between the helical section 40a and the axial section 40b of the slot, the locking bar 12 is in its operative angular position, but is still not in contact with the wheel 16. Further rotation of the operating handle 18, and associated axial movement of the shaft 20, moves the locking bar 12 into engagement with the wheel 16. Typically, the wheel 16 has a pneumatic or resilient tire about its circumference, and the locking bar 12 deforms the tire slightly to provide a reliable locking action.

The eccentric cam 18a has a portion 18b of its circumference that is relatively flat. This portion is in contact with the button element 32 in the locking position of the brake, and acts as a detent device to hold the brake in this position. A positive force on the operating handle 18 is required to release the brake, and the spring 34 and the wheel 16 must be further compressed in order to move the flat portion 18b of the eccentric cam out of engagement with the button element 32. Then the spring 32 acts as a return spring and totally releases the brake, returning the locking bar 12 to its originally retracted position 12'.

It will be appreciated from the foregoing that the present invention represents a significant advance in the field of parking brakes for wheelchairs. In particular, the invention provides a reliable wheel locking mechanism that is easy to operate but is fully retracted upon release, to facilitate manual propulsion of the wheelchair. It will also be appreciated that, although a preferred embodiment of the invention has been described in detail for purposes of illustration, various modifications may be made without departing from the spirit and scope of the invention. Accordingly, the invention is not to be limited except as by the appended claims.

I claim:

1. A parking brake for a wheelchair, comprising:
a locking bar; and
mechanical means for moving the locking bar between a first angular position in which the locking bar is not intersecting the plane of a wheel of the wheelchair, and a second angular position in which the locking bar intersects the plane of the wheel, and for moving the locking bar in a substantially radial direction with respect to the wheel, between a released position and a locking position, the bar being in locking contact with the wheel when in the second angular position and the locking position, wherein the mechanical means for moving the locking bar includes
a tube rigidly connected to the wheelchair,
a shaft connected to the locking bar and mounted for sliding and rotational movement within the tube,
hand-operated means for applying axial motion to the shaft within the tube, to move it in the radial direction, and
camming means for converting axial movement of the shaft to an angular movement between the first and second angular positions;
wherein the mechanical means functions to apply the brake by moving the locking bar initially to the second angular position and an intermediate radial position, and then to the locking position while maintaining the second angular position.

2. A parking brake as set forth in claim 1, wherein the camming means includes:
a camming slot in the tube wall; and
a guide pin extending radially from the shaft and into the camming slot;
and wherein the camming slot has a helical section to convert axial movement of the shaft into angular movement between the first and second angular positions, and an axial section contiguous with the helical section, to provide an axial locking movement in the second axial position.

3. A parking brake as set forth in claim 2, wherein said means for moving the shaft axially includes:
an eccentric cam mounted for rotation on an axis transverse to the tube, and having an attached operating handle; and
a return spring urging one end of the shaft into contact with the eccentric cam, whereby rotation of the operating handle cams the shaft axially within the tube.

4. A parking brake as set forth in claim 3, wherein:
the eccentric cam has a relatively flat section that engages the end of the shaft in the second axial position, to function as a detent in the operative position of the brake.

5. A parking brake for a wheelchair, comprising:
a locking bar; and
mechanical means, including means for moving the locking bar linearly in a direction having a radial component with respect to a wheel of the wheelchair, and also including means for converting part of this linear movement into an angular movement between a retracted position in which the locking bar is clear of the wheel and an operative angular position in which the locking bar intersects the plane of the wheel, whereby the locking bar is rotated to the operative angular position while being moved linearly, and is moved further linearly into locking engagement with the wheel while in the operative angular position;
wherein the means for rotating and moving the locking bar linearly includes a shaft of circular cross section rigidly attached to the locking bar, a tube in which the shaft is mounted for sliding and rotational movement, and hand-operated means not rigidly connected to the shaft, for moving it axially within the tube;
and wherein the means converting linear movement to angular movement includes an arcuate slot in the tube wall, and a radial pin protruding from the shaft and engaging the arcuate slot.

6. A wheel braking device for use with a wheelchair, said brake device comprising:
(a) brake mounting means for mounting the brake device to a frame of a wheelchair,
(b) a hand engagable and hand operable lever means pivotally mounted with respect to said mounting means and capable of being pivotally movable with respect thereto from a wheel locking position to a non-locking position, (c) an elongate shaft having an longitudinal central axis, said shaft being mechanically coupled to but independently movable with respect to said lever means, said shaft also being axially shiftable and rotatable about its longitudinal central axis, (d) a wheel engaging arm operatively secured to said shaft and being capable of moving through an arcuate path to a non-locking position in which the arm cannot engage a wheel of the wheelchair when the lever means is in the non-locking position, said arm also being capable of moving through the arcuate path to a locking position angularly spaced from the non-locking position of the arm and engaging said wheel to prevent rotation thereof when the lever means is in the locking position, and (e) rotation effecting means for rotating said shaft about its longitudinal central axis in response to movement of said lever means so that said shaft is axially shifted and rotated to cause said arm to be moved through the arcuate path to its locking position, in which the arm is engagable with the wheel when the lever means is in the wheel locking position, and wherein said rotation effecting means also causes movement of said arm in a reverse direction through the arcuate path about the axis of said shaft, to the non-locking arm position in which said arm cannot engage said wheel when the lever means is in the non-locking position, and in which said arm is not likely to be contacted by a hand of a user.

* * * * *